(12) United States Patent
Mon Pere

(10) Patent No.: US 11,967,244 B2
(45) Date of Patent: Apr. 23, 2024

(54) TEXTURED SCREEN COVER FOR TACTILE LEARNING AND METHOD OF USE THEREOF

(71) Applicant: Susan E. Mon Pere, Fresno, CA (US)

(72) Inventor: Susan E. Mon Pere, Fresno, CA (US)

(*) Notice: Subject to any disclaimer, the term of this patent is extended or adjusted under 35 U.S.C. 154(b) by 86 days.

(21) Appl. No.: 14/051,394

(22) Filed: Oct. 10, 2013

(65) Prior Publication Data

US 2015/0024371 A1    Jan. 22, 2015

Related U.S. Application Data

(60) Provisional application No. 61/754,838, filed on Jan. 21, 2013.

(51) Int. Cl.
| | |
|---|---|
| *G09B 19/00* | (2006.01) |
| *C09J 7/22* | (2018.01) |
| *G09B 5/02* | (2006.01) |
| *G09B 11/04* | (2006.01) |

(52) U.S. Cl.
CPC ............... *G09B 19/00* (2013.01); *C09J 7/22* (2018.01); *G09B 5/02* (2013.01); *G09B 11/04* (2013.01); *C09J 2203/318* (2013.01); *C09J 2301/302* (2020.08); *Y10T 428/24355* (2015.01)

(58) Field of Classification Search
CPC ....... G06F 3/04886; G06F 2203/04809; G06F 3/0202; G06F 3/03547; G06F 3/016; G09B 19/00; G09B 5/02; G09B 11/04; C09J 7/22; C09J 2201/606; C09J 2203/318; Y10T 428/24355

USPC .......................................................... 434/428
See application file for complete search history.

(56) References Cited

U.S. PATENT DOCUMENTS

| | | | | |
|---|---|---|---|---|
| 3,512,273 A | * | 5/1970 | Baker, Jr. ............... | G09B 11/04 434/163 |
| 4,315,748 A | * | 2/1982 | Frascara ............... | G09B 17/00 434/159 |
| 4,878,844 A | * | 11/1989 | Gasper ................... | G09B 17/00 434/167 |
| 6,481,127 B1 | * | 11/2002 | Bilbie ....................... | G09F 3/10 40/594 |
| 6,884,082 B1 | * | 4/2005 | James ....................... | B43L 1/00 434/408 |
| 8,092,223 B1 | * | 1/2012 | Sharp ..................... | G09B 11/04 434/162 |

(Continued)

*Primary Examiner* — Jack Yip
(74) *Attorney, Agent, or Firm* — Richard A. Ryan

(57) ABSTRACT

An improved screen cover that is configured for tactile learning and a method of utilizing the screen cover for tactile learning. The screen cover is sized and configured to be utilized over the useable area on the upper surface of a tablet, smart phone, computer screen or other touch screen device that displays information which the person using the screen cover and touch screen device can better learn by tactile learning procedures. The screen cover comprises a transparent sheet having a top surface and a bottom surface, with a plurality of textured elements thereon that extend above the top surface. The textured elements can be in a non-Braille pattern. The bottom surface removably attaches to the touch screen device. The person traces his or her finger along the textured elements over the displayed information to utilize the sense of touch to help the person learn and retain the displayed information.

4 Claims, 3 Drawing Sheets

(56) References Cited

U.S. PATENT DOCUMENTS

| | | | | |
|---|---|---|---|---|
| 2002/0003469 | A1* | 1/2002 | Gupta | G09B 21/005 |
| | | | | 340/407.1 |
| 2002/0054030 | A1* | 5/2002 | Murphy | G06F 1/1626 |
| | | | | 345/173 |
| 2005/0030296 | A1* | 2/2005 | Stohrer | G03G 15/5016 |
| | | | | 345/173 |
| 2005/0106538 | A1* | 5/2005 | Freeman | G09B 7/00 |
| | | | | 434/167 |
| 2006/0022956 | A1* | 2/2006 | Lengeling | G06F 3/04847 |
| | | | | 345/173 |
| 2006/0088803 | A1* | 4/2006 | Bianco | G09B 11/04 |
| | | | | 434/163 |
| 2008/0263923 | A1* | 10/2008 | Kim | |
| 2010/0143875 | A1* | 6/2010 | Savatovich | B43L 1/12 |
| | | | | 434/415 |
| 2011/0000802 | A1* | 1/2011 | Weiss | B64C 39/024 |
| | | | | 493/405 |
| 2011/0260980 | A1* | 10/2011 | Palacios | |
| 2012/0250242 | A1* | 10/2012 | Graneto, III | G06F 1/1656 |
| | | | | 361/679.26 |
| 2013/0332827 | A1* | 12/2013 | Smith | G06F 3/016 |
| | | | | 715/702 |
| 2014/0120501 | A1* | 5/2014 | Cooke | A63F 9/06 |
| | | | | 434/81 |

* cited by examiner

TEXTURED SCREEN COVER FOR TACTILE LEARNING AND METHOD OF USE THEREOF

CROSS-REFERENCE TO RELATED APPLICATIONS

This patent application claims priority to U.S. Provisional Patent Application No. 61/754,838 filed Jan. 21, 2013.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to products utilized with touch screen devices, including tablets, mobile telephones, laptop computers and computer monitors, to facilitate use of the device for tactile learning activities. In particular, the present invention relates to screen covers that are placed on the useable screen surface of a touch screen device to protect the screen and facilitate use of the device for tactile learning activities. Even more particularly, the present invention relates to such screen covers that have a textured surface configured to allow use of the device for tactile learning and a method of using such a screen cover for tactile learning.

B. Background

For many years electronic devices have had a display screen that is directly associated with the device, either by being attached to the device via an electronic cord or integrally incorporated within the device, that displays information which is produced by the device. The screen of traditional electronic devices only displayed the information for the user without the ability of the user to effect any change to the device by interacting with the screen. As well known, however, many electronic devices now utilize touch screens, typically but not exclusively incorporated into the device, that are configured to display information and allow the user to interact with and operate the device by touching the screen. Examples of such electronic devices are tablets, mobile telephones, laptop computers and computer monitors. These and other similarly configured devices are referred to herein as a "touch screen device" or collectively referred to herein as "touch screen devices". The typical touch screen device comprises a case that encloses the electronic components of the device and an upper surface having a border area around a useable screen surface that displays information from the device and which allows the user to interact with the device. As well known, the electronic components allow the user to accomplish a wide variety of different computer or computer-related tasks, including running computer programs and applications, by pressing or moving a finger or stylus-type tool across the useable screen surface of the device. One major benefit of touch screen devices is that the user can start the device, operate the device, interact with programs stored in the device, enter data and other information into the programs to achieve desired results and accomplish a wide variety of other objectives without the need for a mouse, keyboard, keypad or other user interactive device that would otherwise normally be required to accomplish these objectives.

Because touch screen devices are most commonly operated by using a finger or a stylus-type tool, either of which can potentially scratch or otherwise damage the screen, it is well known to place a screen cover (frequently referred to as a screen protector) on the upper surface of the device that at least substantially covers the useable screen area thereof. In addition to protecting the screen from scratches, nicks and the like, screen protectors also protect the screen of the touch screen device from oils and other substances on the user's fingers that could leave prints, which are often hard to remove, on the screen. As also well known, screen protectors also provide a certain degree of protection from damage due to liquids, food and other such materials. Some screen protectors are configured to provide some protection against damage from being dropped or having items dropped thereon. Common features of such screen protectors is that they are transparent so the user can still see the screen, removably stick to the surface of the screen so they can be replaced as needed or desired and allow the physical touch, whether from a person or tool, to pass through to the underlying touch screen to allow the user to control or operate the touch screen device. The configuration and use of such screen protectors are generally well known in the art.

One relatively common use for touch screen devices is as a tool to assist the user with learning, whether by providing reading or study material that the user reads, video that is watched to provide information, screen data that summarizes other information and the like. Unfortunately, the present use of touch screen devices as a learning tool only really benefits persons who are able to learn from either visualizing and/or hearing the learning material through written text and/or videos. As generally well known, however, many people do not learn very easily, quickly or well by only seeing or hearing the learning materials. For some of these people, they may best learn by using their sense of touch. This type of learning is commonly referred to as "tactile learning". Although the need and use of tactile learning methods is perhaps most commonly utilized for children having learning or developmental issues or for general early learning applications, tactile learning may also be beneficially utilized for people of all ages and learning and developmental skill levels. One example method of using tactile learning is to let the person handle and touch the item from which they are learning, such as a book or magnetic letters/numbers, and trace their finger(s) along the surface and edges of the items. For many tactile learners, the parent or teacher can assist him or her by providing them with physical objects, including cookies, candies and the like, that are shaped in the form of what they need to learn (i.e., letter or number shaped cookies) or assisting him or her with drawing the letters or numbers in a sand tray so they can feel the letter/number. Models, puzzles, textured maps and globes, jigsaw puzzles, lab experiments and the like are commonly utilized to assist the tactile learner with learning the materials that many other people are able to learn by reading text, listening to lectures and like teaching methods.

Although many different types of tactile learning programs have been produced for use with touch screen devices and other electronic devices (such as computers and laptops), use of these learning programs have the major limitation that the user is expected to learn from touching a flat screen surface. Often this entails placing the tactile learners finger against the touch screen and moving his or her finger along the path of a number, letter or other object which he or she is expected to learn. As can be readily appreciated, this method of tactile learning has a significant limitation in that the tactile learner is only moving his or her finger along the flat, hard, non-textured surface of the touch screen device (most often having a flat, smooth screen protector on the upper surface of the device), thereby significantly limiting the touch/feel sensation that is necessary to provide the most learning benefits to the tactile learner.

What is needed, therefore, is an improved screen protector that is specifically configured to allow persons to utilize screen devices for tactile learning and a method of utilizing such a screen protector on the touch screen device to improve the learning process for tactile learners. The improved screen protector should be specially configured to provide the touch/feel sensation that benefits the tactile learner to a touch screen device so computer programs and applications can be utilized on the touch screen device in able to assist the learning process of those persons who benefit from tactile learning techniques. Preferably, the improved screen protector will be able to removably attach to the upper surface of a touch screen device and, in addition to assisting with tactile learning, provide the benefits of a normal screen protector for such devices. It is also preferred that any such screen protector should be configured for use on most, if not all, commonly available touch screen devices and adaptable, as may be necessary, for future touch screen devices.

SUMMARY OF THE INVENTION

The textured screen cover and method of using the screen cover of the present invention provides the benefits and solves the problems identified above. That is to say, the present invention is directed to an improved screen cover for use with touch screen devices and a method of utilizing such a screen cover that are specially configured to assist those persons who can benefit from tactile learning techniques. The screen cover of the present invention is configured in much the same manner as conventional screen protectors except that the top surface of the screen cover comprises a plurality of textured elements thereon that the tactile learner utilizes to touch, and as a result "feel" the letters, numbers and other information that is displayed on the screen of the touch screen device so he or she may better learn that information. In a preferred configuration of the screen cover and method of the present invention, the tactile learner can trace his or her finger over the screen cover along the path of the information displayed on the screen of the touch screen device. While the tactile learner does this, he or she will feel the textured elements of the new screen cover, thereby helping connect the movement of his or her finger with the shape of the information (i.e., number, letter, map, timeline or etc.) to better register the information in his or her memory. In a preferred configuration, the new screen cover removably attaches to the upper surface of the touch screen device so it can be replaced when necessary, such as when torn or dirty, or when it may otherwise be desired. The improved screen cover of the present invention can be utilized with presently available and/or newly developed computer programs and applications that, in one embodiment, are selected or developed so as to be beneficially utilized with the textured elements on the new screen cover.

In a preferred embodiment, the new screen cover will also provide the screen protection benefits of a normal screen protector for touch screen devices. The textured screen cover of the present invention can be used with most, if not all, commonly available touch screen devices and it is readily adaptable, as may be necessary, for future touch screen devices.

In one embodiment of the present invention, the textured screen cover for tactile learning generally comprises a transparent sheet having a top surface and a bottom surface and a plurality of textured elements that are disposed on the transparent sheet so as to extend above the top surface of the transparent sheet. The bottom surface is configured to be placed in abutting relation to the upper surface of a touch screen device, such as a tablet, smart phone a computer having a touch screen display or the like. In one embodiment of the screen cover of the present invention, the textured elements sufficiently extend across the transparent sheet so as to place the textured elements substantially over the entire useable area of the touch screen device. The plurality of textured elements are positioned on the transparent sheet so as to facilitate use of the screen cover for tactile learning when the touch screen device displays one or more displayed information, such as numbers, letters, maps, timelines and the like, in the useable area thereof. In the preferred embodiment, the bottom surface of the transparent sheet has adhesive material that is selected to allow the screen cover to be removably attached, preferably easily removable, to the upper surface of the touch screen device. In one embodiment, the textured elements are positioned on the transparent sheet in one or more non-Braille patterns.

In one embodiment of the method of the present invention, the method of utilizing a textured screen cover for tactile learning generally comprises the steps of: (a) placing the screen cover described above on a useable screen area of an upper surface of a touch screen device; (b) operating the touch screen device so as to display displayed information in the useable screen area of the touch screen device with the textured elements over the displayed information; (c) pressing a finger of the user against the textured elements over the displayed information; and (d) moving the user's finger across the textured elements so as to trace the displayed information, thereby improving the user's learning and retention of the displayed information.

Accordingly, the primary aspect of the present invention is to provide a textured screen cover for tactile learning and method of using the same that has the advantages discussed above and which overcomes the various disadvantages and limitations associated with prior art devices and methods for assisting tactile learners learn various subject matters.

It is an important aspect of the present invention to provide a new screen cover for use on touch screen devices that is textured to assist persons who learn better with tactile learning procedures to be able to better utilize a touch screen device for tactile learning.

It is also an important aspect of the present invention to provide a new screen cover for use on touch screen devices that is generally configured in much the same manner as conventional screen protectors except that the top surface of the screen cover has a plurality of textured elements thereon that the tactile learner can utilize to touch and feel the letters, numbers and other information that is displayed on the screen of the touch screen device.

It is also an important aspect of the present invention to provide a new screen cover that allows the tactile learner to trace his or her finger over the screen cover along the path of the information displayed on the screen of the touch screen device while feeling the textured elements of the new screen cover, thereby helping connect the movement of his or her finger with the shape of the information on the touch screen device to better register that information in his or her memory.

It is also an important aspect of the present invention to provide a new screen cover that removably attaches to the upper surface of a touch screen device and which provides at least a minimal level of protection for the underlying screen.

It is also an important aspect of the present invention to provide a new screen cover that is configured to be utilized with presently available and/or newly developed computer programs and applications that are selected so as to be beneficially utilized with the textured elements on the new screen cover.

Another important aspect of the present invention is to provide a new method of teaching persons who best learn by use of tactile learning procedures that utilizes a textured screen cover appropriately positioned over the screen of a touch screen device.

The above and other aspects of the present invention are explained in greater detail by reference to the attached figures and to the description of the preferred embodiments which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show a particular type of touch screen device and use of the new screen cover with that device, those skilled in the art will readily appreciate that the present invention is not so limited.

Figure 1:
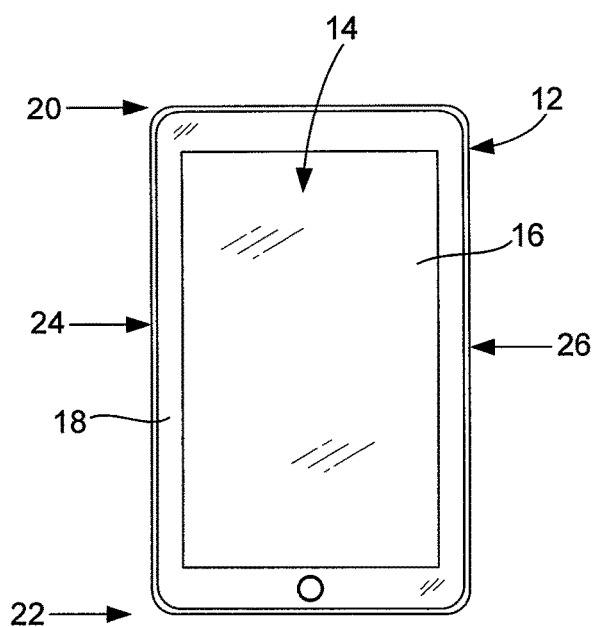
FIG. 1 is a top view of an exemplary prior art touch screen device.
Figure 2:
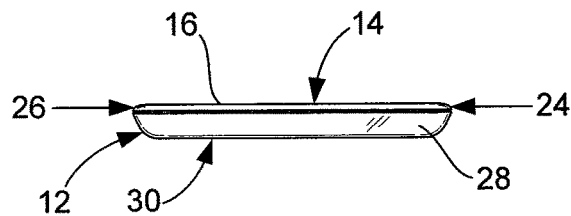
FIG. 2 is an end view of the top end of the prior art touch screen device of FIG. 1.
Figure 3:
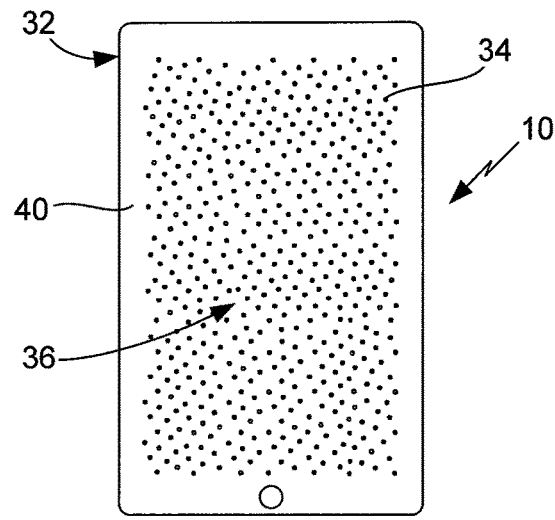
FIG. 3 is a top view of a first embodiment of the textured screen cover of the present invention.
Figure 5:
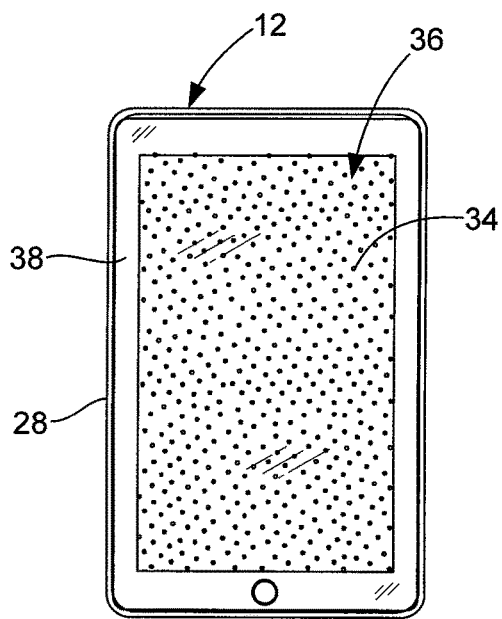
FIG. 5 is a top view of the screen cover of FIG. 3 shown in use on the prior art touch screen device of FIG. 1.
Figure 4:
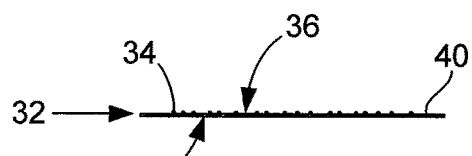
FIG. 4 is an end view of the screen cover of FIG. 3.
Figure 6:
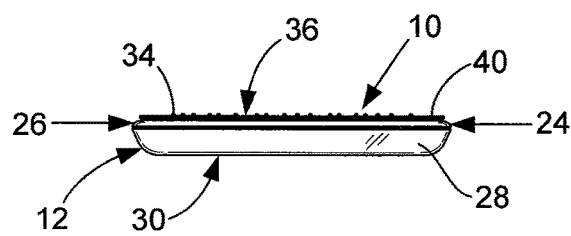
FIG. 6 is an end view of the top end of the combined screen cover and prior art touch screen device of FIG. 5.

A textured screen cover for tactile learning that is configured pursuant to one embodiment of the present invention is shown generally as 10 in FIGS. 3 through 9. As set forth in more detail below, the screen cover 10 of the present invention is configured for use with a touch screen device 12, an example of which is shown in FIGS. 1-2 and 5-7. Although in these figures the touch screen device 12 is a tablet type of computer device, the touch screen device 12 can be a mobile telephone, laptop computer, computer monitor and like devices having an upper surface 14 that defines a useable screen area 16 which, in addition to displaying data and other information, functions as a touch-operated screen that allows the user to operate the touch screen device 12, enter data into programs, applications and the like that are operated by the touch screen device 12 and perform a wide variety of other operations using touch screen device 12. Typically, the useable screen area 16 is bounded on all sides by a non-touch border 18, as best shown in FIG. 1, which extends generally from the top end 20, bottom end 22, left or first side 24 and right or second side 26. The touch screen device has a case 28 that encloses the electronic components and defines the lower surface 30 of the touch screen device 12. The general configuration, use and operation of such touch screen devices 12 are well known in the art.

As set forth in the Background, touch screen devices 12 are utilized for a wide variety of computing, telephone and other uses. One such use is to help teach persons the various information and skills which will allow them to better function in society. As further set forth in the Background, most persons use a transparent screen protector on the upper surface of their touch screen device 12 to prevent dirt, fingerprints, oil, sweat and the like from accumulating on at least the useable screen area 16 and reduce the likelihood of scratches, nicks and other damage to the useable screen area 16. Typically, most prior art screen protectors extend substantially from the top end 20 to the bottom end 22 and from the first side 24 to the second side 26, thereby encompassing both the useable screen area and the non-touch border 18 underneath the screen protector. In order to better utilize the touch screen device 12 for persons who are tactile learners, also discussed above, the improved screen cover 10 of the present invention comprises a transparent sheet 32 that has a plurality of textured elements 34 disposed on the top surface 36 thereof. In one embodiment, the transparent sheet 32 is made out of material that is the same as or at least substantially similar to prior art screen protectors. Alternatively, other screen cover materials may be found to be more suitable and/or beneficial for the screen cover 10 of the present invention. In a preferred embodiment, the textured elements 34 are positioned on the transparent sheet 32 across substantially the entire portion of the transparent sheet 32 that will cover or at least substantially cover the useable screen area 16 of the touch screen device 12 so that any information displayed in the useable screen area 16, referred to as the displayed information 38 (as shown on FIG. 7) will have one or more of the textured elements 34 positioned above the displayed information 38 that is being displayed by the subject touch screen device 12.

The textured elements 34 are sized and configured to rise above the top surface 36 of the transparent sheet 32 in amount sufficient for the tactile learner to feel the textured elements 34 as he or she moves a finger or other body part across the screen cover 10. Because information will not be displayed in the non-touch border 18, the periphery area 40 of the transparent sheet 32 (being that area which does not cover the useable screen area 16) does not need to have any textured elements 34. In fact, to avoid issues with the tactile learner and facilitate placement and/or handling of the screen cover 10, it is likely preferred to leave the periphery area 38 clear of any textured elements 34, as shown in FIGS. 3 through 9. In one embodiment, the lower surface 42 of transparent sheet 32 comprises an adhesive or other material that is selected so as to allow the screen cover 10 to be removably affixed to the upper surface 14 of the touch screen device 12. In this embodiment, the adhesive that is utilized with screen cover 10 can be of the same type that is utilized with prior art screen protectors which are commonly utilized to cover and, at least generally, protect touch screen devices 12. The use and makeup of such adhesives are well known in the art. Alternatively, a slightly or somewhat less sticky adhesive can be utilized on the bottom surface 42 of the transparent sheet 32 so that the screen cover 10 of the present invention can be more easily removed from the touch screen device 12 to facilitate replacement as may be necessary for sanitary reasons, such as when screen cover 10 becomes dirty, or when the screen cover 10 is excessively worn from repeated use thereof. A less sticky screen cover 10 also facilitates quick and easy placement and removal of screen cover 10 when the textured elements 34 are intended to match the image on the touch screen device 12, such as a map, timeline or picture. The less sticky adhesive will also facilitate removal of the screen cover 10 from the touch screen device 12, and then placement back onto the touch screen device 12, when the user thereof desires to use the touch screen device 12 for non-tactile learning purposes (i.e., prior art uses thereof). In the embodiments where the bottom surface 42 comprises an adhesive, the lower surface 42 of the screen cover 10 will be typically covered with a plastic film or the like, as done with prior art screen protectors, to protect the adhesive thereon from inadvertently sticking to other surfaces and to prevent or at least reduce the likelihood of the adhesive drying out or the like that can cause the adhesive to no longer be able stick to the upper surface 14 of the touch screen device 12. In yet another embodiment, the material for screen cover 10 can be selected so it sticks to the upper surface 14 of the touch screen device 12 without the need for adhesives. If desired, a securing device, such as a string, rubber band, clips or the like, can be utilized to secure the screen cover 10 to the touch screen device 12.

Figure 7:
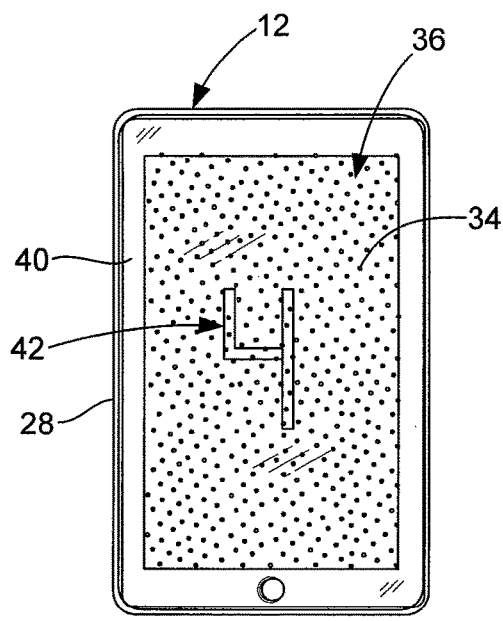
FIG. 7 is a top view of the screen cover of and touch screen device of FIG. 5 shown in use with information displayed by the touch screen device under the screen cover.
Figure 8:
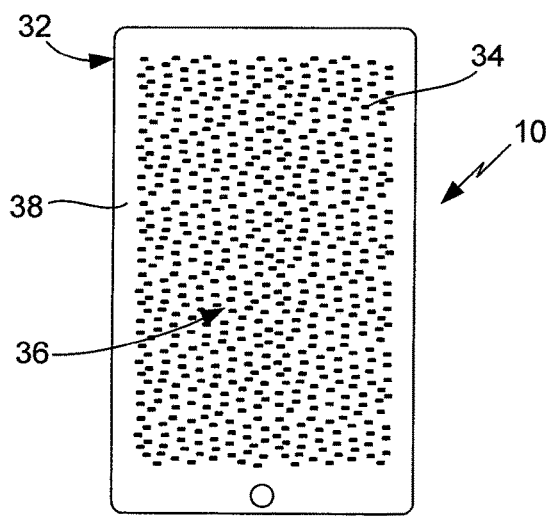
FIG. 8 is a top view of a second configuration of the textured screen cover of the present invention showing a generally oblong-shaped configuration for the textured elements.
Figure 9:
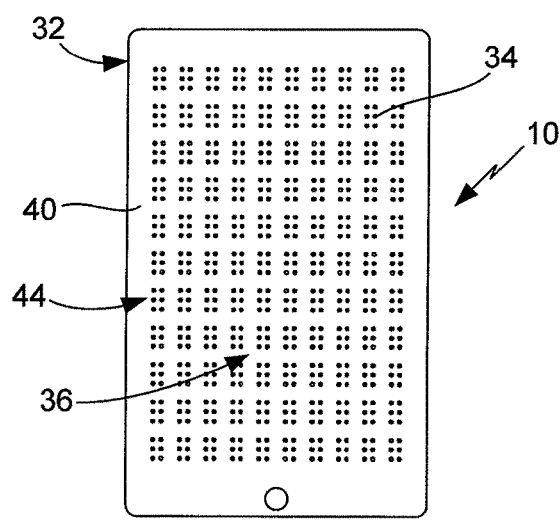
FIG. 9 is a top view of a third configuration of the textured screen cover of the present invention showing the use of a pattern configuration for the textured elements.

In FIGS. 3-7, the textured elements 34 on the screen cover 10 are small circular dot or dot-like projections that extend only a very small amount above the top surface 36 of the transparent sheet 32, such as 1-2 mm. In FIG. 8, the textured elements 34 are slightly oblong shaped objects. The invention is not limited to any particular size or shape of textured elements 34. As will be readily appreciated by those skilled in the art, a wide variety of different sizes and shapes of textured elements 34 can be utilized for the screen cover 10 to achieve the various objectives of the present invention, such as facilitating the tactile learner moving his or her finger along information, referred to herein as displayed information 42 (as shown in FIG. 7), that is displayed on the upper surface 14 of the touch screen device 12, typically by way of a computer program or other application running on the touch screen device 12. For instance, the textured elements can be square, rectangle, oval, star or a wide variety of other shapes that are selected for the ability to provide the tactile learning described herein. In a preferred embodiment, the textured elements 34 are at least somewhat randomly placed on the top surface 36 of transparent sheet 32 such that they do not form a pattern thereon. For instance, in one embodiment it is preferred that the textured elements 34 are not placed in or form any linear patterns, which could cause the tactile learner to follow a line of textured elements 34 instead of following along the displayed information 38 as desired for purposes of facilitating tactile learning. In another embodiment, the textured elements 34 can be positioned in one or more random patterns 44, such as the plurality of rectangle-shaped patterns shown in FIG. 9, on the top surface 36 of the transparent sheet 32. As will be readily appreciated by those skilled in the art, the pattern 44 shown in FIG. 9 is shown for exemplary purposes only, as the pattern 44 may comprise one or more of a wide variety of different shapes. Experimentation with the textured elements 34 and the various patterns 44 may find placement, size, height and patterns 44 for the textured elements 34 that work better than others. For most purposes of screen cover 10 of the present invention, it is preferred that other recognizable textured patterns, such as braille letters or braille-like designations, not be formed by the textured elements 34, which patterns may confuse the tactile learner and result in him or her following the pattern instead of the displayed information 38. In another embodiment, the textured elements 34 may be in a pattern 44 that matches the image displayed on the touch screen device 12, such as a map, timeline, science drawings, pictures and the like. As stated above, preferably the textured elements 34, whether in a pattern 44 or not, at least substantially extend over the entire useable screen area 16 of the touch screen device 12 when the screen cover 10 is placed on the touch screen device 12 so the tactile learner will be able to touch over any area where the displayed information 38 is or may be displayed by the touch screen device 12.

Figure 10:
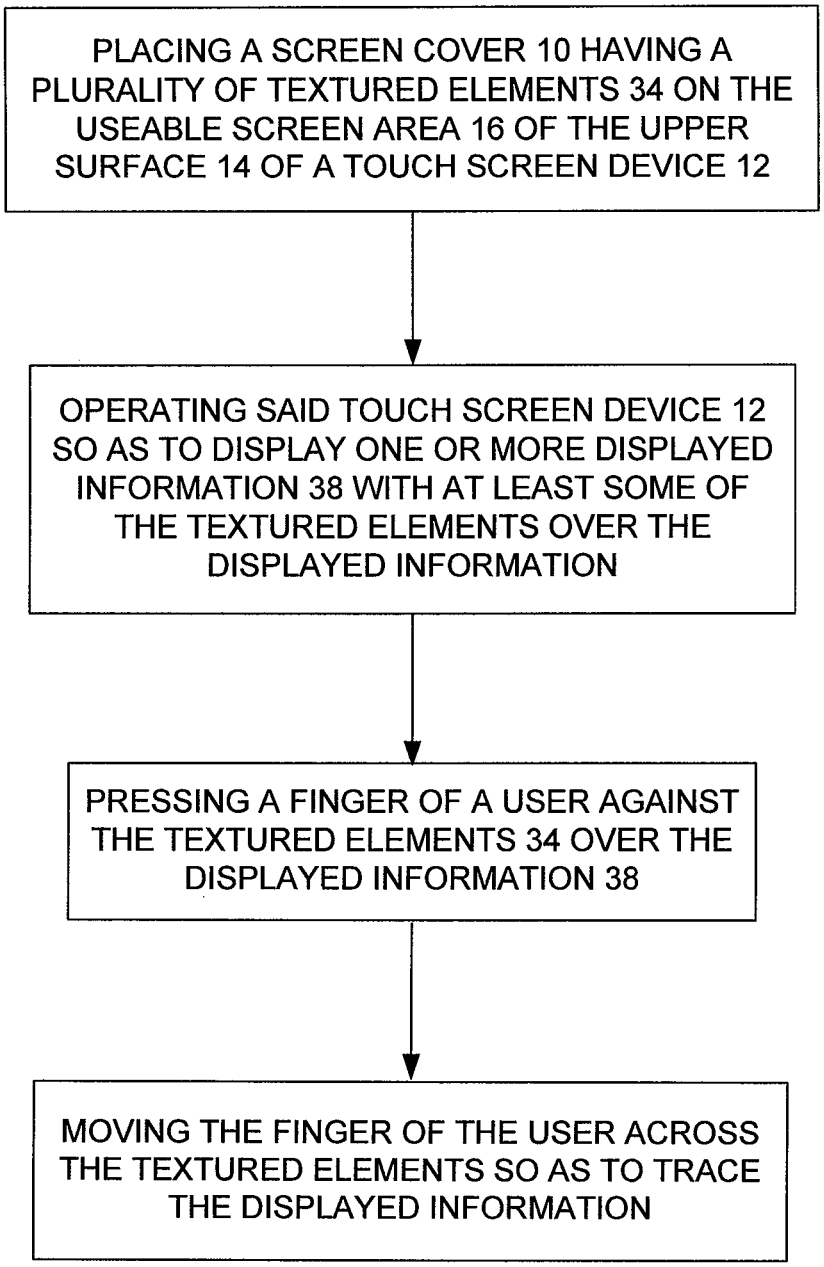
FIG. 10 is a chart summarizing the method of using the textured screen of the present invention on a touch screen device for improved tactile learning.

A method of utilizing the screen cover 10 of the present invention on a touch screen device 12 for tactile learning is shown as 46 on FIG. 10. In use, the bottom surface 42 of the screen cover 10 is placed on the upper surface 14 of the touch screen device 12, usually after removing the plastic film or the like covering the adhesive on the bottom surface 42, typically by aligning the edges thereof with the ends 20/22 and sides 24/26 of the touch screen device 12, as is done with the prior art screen protectors and the like. To prevent excessive thickness on top of the upper surface 14 of touch screen device 12, which could prevent the touch operation thereof, generally it will be best to use the screen cover 10 directly on the upper surface 14 of the touch screen device 12 (e.g., with no prior art screen protector/cover on the upper surface 14). In a preferred embodiment, proper placement of the screen cover 10 on the touch screen device 12 will cause the textured elements 34 on the transparent sheet 32 to at least substantially cover, if not entirely be placed over, the useable screen area 16 of the touch screen device 12. Once in position, the touch screen device 12 is operated as normal to display the displayed information 38 that is the subject of the tactile learning for which the screen cover 10 of the present invention is being utilized. In the example of FIG. 7, the displayed information 38 is the number "4". As shown, a plurality of textured elements 34 cover the displayed information 38. The tactile learner, either on his or her own or with assistance from a parent, teacher, teacher's aid or other person, will slightly press against the top surface 36 of the screen cover 10 and then trace along the displayed information 38 with one of his or her fingers. As the tactile learner is moving along the textured elements 34 which are over the displayed information 38, he or she will be feeling the textured elements 34 against his or her skin. This will cause the tactile learner to better appreciate and learn the movements, shapes and other features of the displayed information 38. Relative to tracing his or her finger along the flat, smooth upper surface 14 of touch screen device 12 or the smooth upper surface of a prior art screen protector on the upper surface 14 thereof (as would be done without the use of screen cover 10 of the present invention), the screen cover 10 substantially improves the likelihood that the tactile learner will learn the displayed information 38 on the touch screen device 12. As set forth above, the displayed information 38 can be a number, letter, map, timeline or a wide variety of other shapes or information.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A screen cover for use on a touch screen device having an upper surface and a touch-operated area, said screen cover comprising:
a transparent sheet having a top surface and a bottom surface, said bottom surface configured to be placed in abutting relation to the upper surface of the touch screen device, said transparent sheet sized and configured to at least substantially cover the touch-operated area of the touch screen device when said screen cover is placed on the touch screen device in abutting relation with the upper surface thereof and said touch screen device is utilized to display one or more displayed information which is to be learned by a user who will benefit from tactile learning;
a plurality of textured elements projecting above said top surface of said transparent sheet, said textured elements sufficiently extending across said transparent sheet so as to place said textured elements substantially over the entire touch-operated area of the touch screen device and over said displayed information thereon, said plurality of textured elements positioned on said transparent sheet so as to facilitate use of said screen cover for tactile learning of said displayed information by the user contacting said textured elements when tracing said displayed information when the touch screen device displays said displayed information in the touch-operated area thereof, said textured elements positioned on said transparent sheet so as to be in non-corresponding relation to said displayed information being displayed on said touch-operated area and in a non-Braille arrangement; and
wherein the touch screen device has a non-touch border extending around a top end, a bottom end, a first side and a second side of the upper surface of the touch screen device with said touch-operated area disposed between the non-touch border, said transparent sheet sized and configured to extend substantially across the entire upper surface of the touch screen device with said textured elements positioned on said transparent sheet so as to not be inside said non-touch border.

2. The screen cover of claim 1, wherein said textured elements are in one or more patterns on said transparent sheet.

3. The screen cover of claim 1, wherein said bottom surface of said transparent sheet has adhesive material thereon, said adhesive material selected so as to removably attach said transparent sheet to the upper surface of the touch screen device.

4. A method of tactile learning, said method comprising the steps of:
a) placing a screen cover on a touch-operated area of an upper surface of a touch screen device, said screen cover having a transparent sheet with a top surface and a bottom surface and a plurality of textured elements disposed on said transparent sheet, said transparent sheet is sized and configured to at least substantially cover the touch-operated area of the touch screen device, said textured elements projecting above said top surface of said transparent sheet, said textured elements sufficiently extending across said transparent sheet so as to place said textured elements substantially over the entire touch-operated area of the touch screen device, said bottom surface configured to be placed in abutting relation to the upper surface of the touch screen device, said textured elements being in a non-Braille arrangement;
b) operating said touch screen device so as to display one or more displayed information in said touch-operated area of said touch screen device with said textured elements over said displayed information;
c) pressing a finger of a user against said textured elements over said displayed information;
d) moving the finger of the user across the textured elements so as to trace the displayed information; and
wherein the touch screen device has a non-touch border extending around a top end, a bottom end, a first side and a second side of the upper surface of the touch screen device with said touch-operated area disposed between the non-touch border, said transparent sheet sized and configured to extend substantially across the entire upper surface of the touch screen device with said textured elements positioned on said transparent sheet so as to not be inside said non-touch border.

* * * * *